United States Patent
Kuhl et al.

[11] Patent Number: 6,027,176
[45] Date of Patent: Feb. 22, 2000

[54] WHEEL

[75] Inventors: Dave Kuhl; Mark Rankin, both of Quincy, Ill.

[73] Assignee: Titan International, Inc., Quincy, Ill.

[21] Appl. No.: 08/949,700

[22] Filed: Oct. 14, 1997

[51] Int. Cl.[7] .................................................. B60B 25/00
[52] U.S. Cl. .................................... 301/11.1; 301/35.62
[58] Field of Search ........................ 301/9.1, 9.2, 10.1, 301/11.1, 35.62, 105.1

[56] References Cited

U.S. PATENT DOCUMENTS

| | | | |
|---|---|---|---|
| 384,189 | 6/1888 | Broyles | 301/9.2 |
| 1,387,793 | 8/1921 | Madjar . | |
| 1,422,408 | 7/1922 | Bellamore et al. . | |
| 2,219,156 | 10/1940 | Yankee | 301/9.1 |
| 2,486,970 | 11/1949 | Nordenson | 301/9.1 |
| 2,489,179 | 11/1949 | Hartman | 301/9.1 |
| 2,646,315 | 7/1953 | Richard | 301/9.1 |
| 3,166,357 | 1/1965 | Vachon et al. | 301/9.2 |
| 3,494,669 | 2/1970 | Reppert | 301/9.1 |
| 3,670,391 | 6/1972 | Cahill | 29/273 |
| 4,002,371 | 1/1977 | Bonne | 301/9 TV |
| 4,515,411 | 5/1985 | Taylor | 301/9 TV |
| 4,643,484 | 2/1987 | Luter et al. | 301/11 S |
| 4,925,248 | 5/1990 | Aderer | 301/9 TV |
| 5,197,785 | 3/1993 | Berry | 301/9.1 |
| 5,380,071 | 1/1995 | Kier, Jr. | 301/10.1 |
| 5,560,686 | 10/1996 | Sayer et al. | 301/9.2 |
| 5,938,291 | 8/1999 | Pankhurst et al. | 301/10.1 |

FOREIGN PATENT DOCUMENTS

| | | | |
|---|---|---|---|
| 1299838 | 3/1987 | U.S.S.R. | 301/9.1 |

*Primary Examiner*—D. Glenn Dayoan
*Assistant Examiner*—Long Bao Nguyen
*Attorney, Agent, or Firm*—Baker & Daniels

[57] ABSTRACT

A wheel for a vehicle comprises a rim disposed about the rotational axis of the wheel and having a pair of axially spaced, circumferentially extending bead seats interconnected by a generally cylindrical base. An annular waffle located in a plane generally perpendicular to the rotational axis is secured to the base intermediate the axial ends thereof. A disk is removably secured to the waffle by way of a plurality of fasteners. The disk and waffle carry co-operating formations which can be brought into mating engagement to allow the disk to be located and held on the waffle at a plurality of different orientations to allow the orientation of the disk with respect to the rim which yields the truest axial alignment of the disk and rim to be determined prior to securing the disk to the waffle via the fasteners.

13 Claims, 6 Drawing Sheets

WHEEL

FIELD OF THE INVENTION

The present invention relates to wheels and in particular to a wheel for a vehicle including a rim and a demountable disk that permits the axial alignment of the disk with respect to the rim to be determined before the disk is secured to the rim.

BACKGROUND OF THE INVENTION

Waffle wheels for vehicles are known in the art and include a rim to support a pneumatic tire having a pair of axially spaced, circumferentially extending bead seats interconnected by a generally cylindrical base. An annular waffle is secured to the base of the rim intermediate the axial ends of the base. A demountable disk including inner and outer flanges interconnected by a web is removably attached to the waffle solely by way of nuts and bolts passing through aligned bolt holes in the waffle and disk.

Unfortunately, gravity and the clearance between the bolts and the holes in both the disk and waffle, allow the disk to be secured to the rim with its center off-center with respect to the center of the rim. It has been found that this potential axial misalignment between the rim and the disk can result in as much as 0.250 inches radial runout. Radial runout adversely affects the ride characteristics and performance of the vehicle on which the wheel is mounted. In addition, radial runout can potentially accelerate structural and component fatigue. Accordingly, improved wheel designs to overcome these disadvantages are sought.

It is therefore an object of the present invention to provide a novel wheel for a vehicle.

SUMMARY OF THE INVENTION

According to one aspect of the present invention there is provided a wheel for a vehicle comprising:

a rim having a generally cylindrical base disposed about the rotational axis of said wheel and an annular waffle attached to said base, said waffle being located in a plane generally perpendicular to said rotational axis;

a disk removably secured to said waffle by way of a plurality of fasteners; and locators to locate and hold said disk on said waffle to allow the axial alignment of said disk and rim to be determined prior to securing said disk to said waffle via said fasteners.

Preferably, the locators allow the disk to be located and held on the waffle at a plurality of different orientations so that the orientation which yields the truest axial alignment of the disk and rim can be determined before the disk is secured to the waffle via the fasteners. It is also preferred that the locators are in the form of at least two diametrically opposed pins on one of the disk and waffle and complimentary alignment holes in the other of the disk and waffle.

In a preferred embodiment, the diametrically opposed pins are provided on the disk and the alignment holes are provided in the waffle at equally spaced locations about the circumference of the waffle. The waffle includes eight alignment holes therein spaced about its circumference at 45 degree intervals and the disc has one pair of diametrically opposed pins thereon. The alignment holes and the pins are located generally midway between pairs of fastener holes provided in the waffle and disk for accommodating the fasteners.

According to another aspect of the present invention there is provided a wheel for a vehicle comprising:

a rim disposed about the rotational axis of said wheel and having a pair of axially spaced, circumferentially extending bead seats interconnected by a generally cylindrical base;

an annular waffle located in a plane generally perpendicular to said rotational axis and being secured to said base intermediate the axial ends thereof; and a disk removably secured to said waffle by way of a plurality of fasteners, said disk and waffle carrying co-operating formations which can be brought into mating engagement to allow said disk to be located and held on said waffle at a plurality of different orientations to allow the orientation of said disk with respect to said rim which yields the truest axial alignment of said disk and rim to be determined prior to securing said disk to said waffle via said fasteners.

In still yet another aspect of the present invention there is provided in a wheel for a vehicle having a rim disposed about the rotational axis of said wheel and including axially spaced, circumferentially extending bead seats interconnected by a generally cylindrical base; a waffle located in a plane generally perpendicular to said rotational axis and being secured to said base intermediate the axial ends of said base; and a disk removably secured to said waffle, the improvement comprising:

locating means to locate and hold said disk on said waffle at a plurality of different orientations to allow the orientation of said disk with respect to said rim which yields the truest axial alignment of said disk and rim to be determined prior to securing said disk to said waffle.

The present invention provides advantages in that since the waffle and disk carry co-operating formations which allow the disk to be located and held on the waffle, the disk can be located and held on the waffle at a plurality of different orientations to allow the orientation of the disk with respect to the rim which yields the truest axial alignment of the disk and rim to be determined before the disk is secured to the waffle. Securing the disk to the waffle at the orientation which yields the truest axial alignment of the disk and rim, of course, helps to reduce radial runout resulting in smoother vehicle ride characteristics and improved performance.

BRIEF DESCRIPTION OF THE DRAWINGS

An embodiment of the present invention will now be described more fully with reference to the accompanying drawings in which.

DETAILED DESCRIPTION OF THE EMBODIMENT

Figure 1:
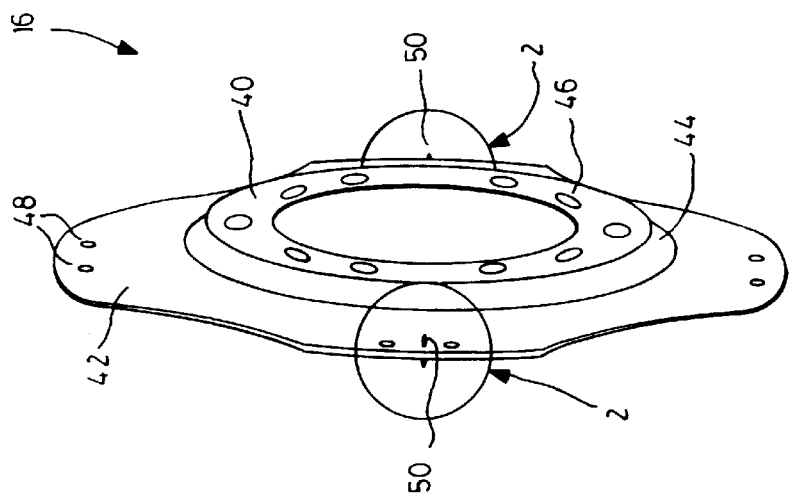
FIG. 1 is an exploded perspective view, partially cutaway, of a wheel for a vehicle in accordance with the present invention.
Figure 1:
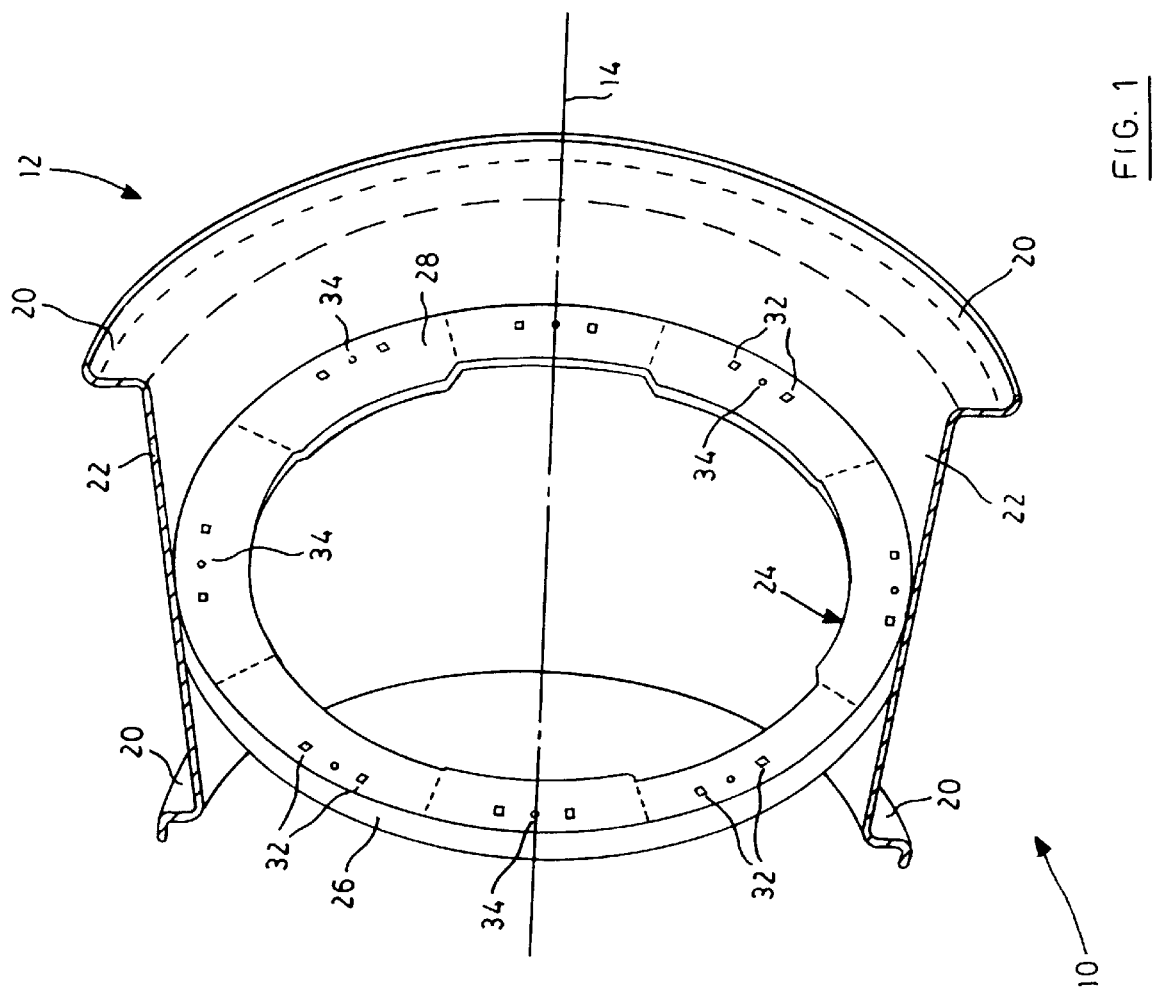
Figure 2:
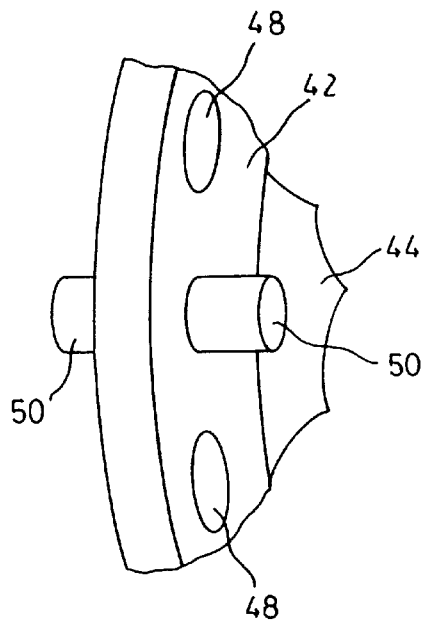
FIG. 2 is an enlarged perspective view of a portion of FIG. 1 taken in the direction of arrow 2.
Figure 7:
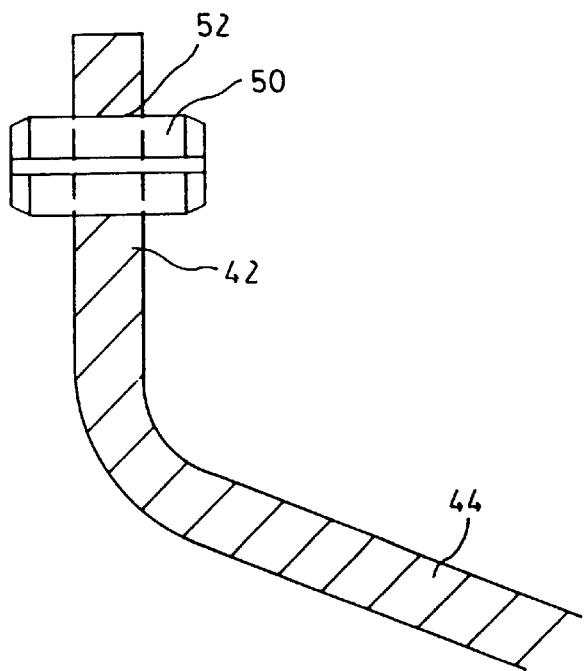
FIG. 7 is a cross-sectional view of FIG. 5 taken along line 7—7.

Referring now to FIG. 1, a wheel for a vehicle in accordance with the present invention is shown and is generally indicated to by reference numeral 10. Wheel 10 includes a rim 12 to support a pneumatic tire and being disposed about the rotational axis 14 of the wheel 10. A disk 16 located in a plane generally perpendicular to the rotational axis 14 is removably attached to the rim 12 by way of a plurality of fasteners in the form of nuts and bolts (not shown).

Figure 3:
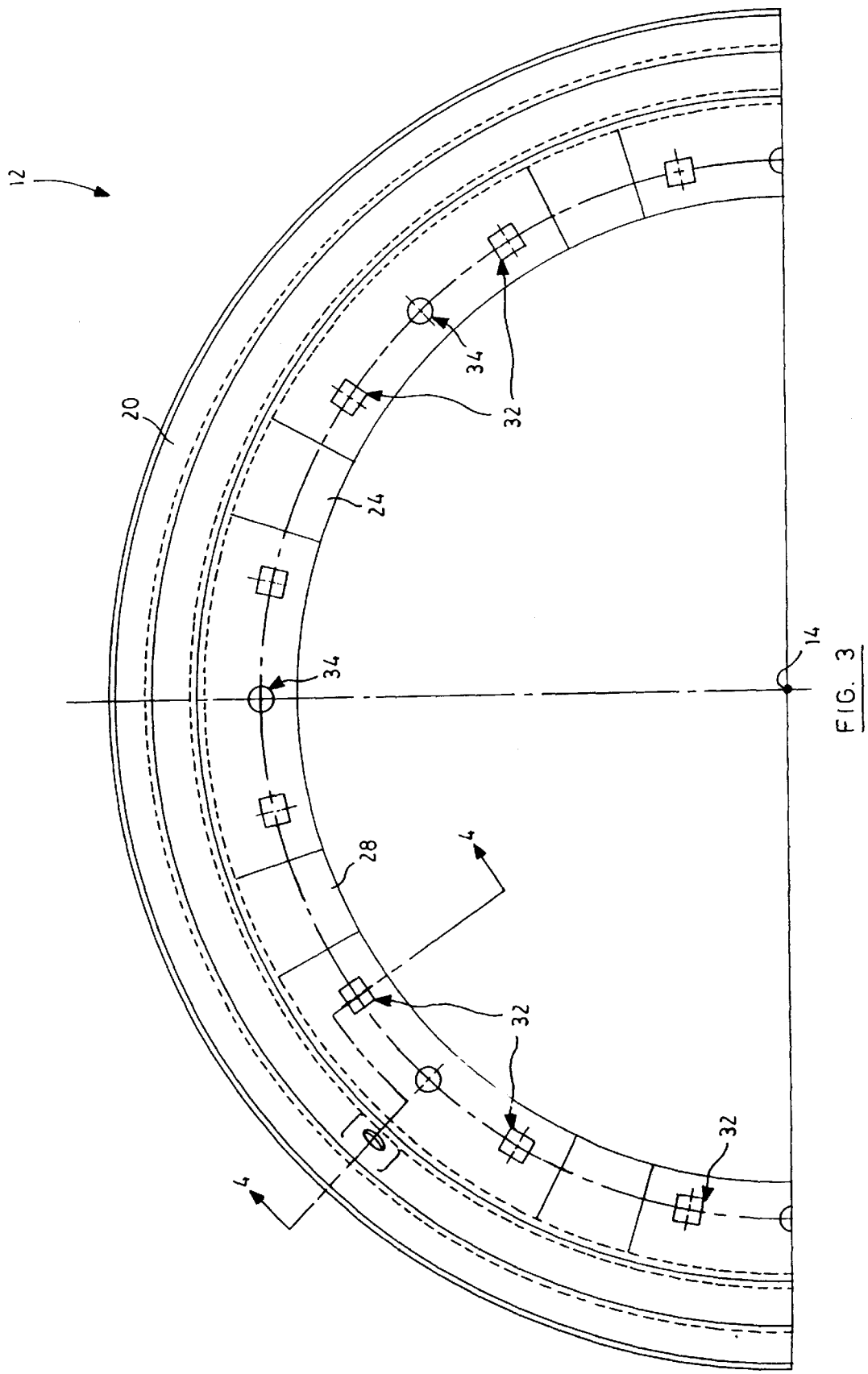
FIG. 3 is a plan view of a portion of a rim forming part of the wheel of FIG. 1.
Figure 4:
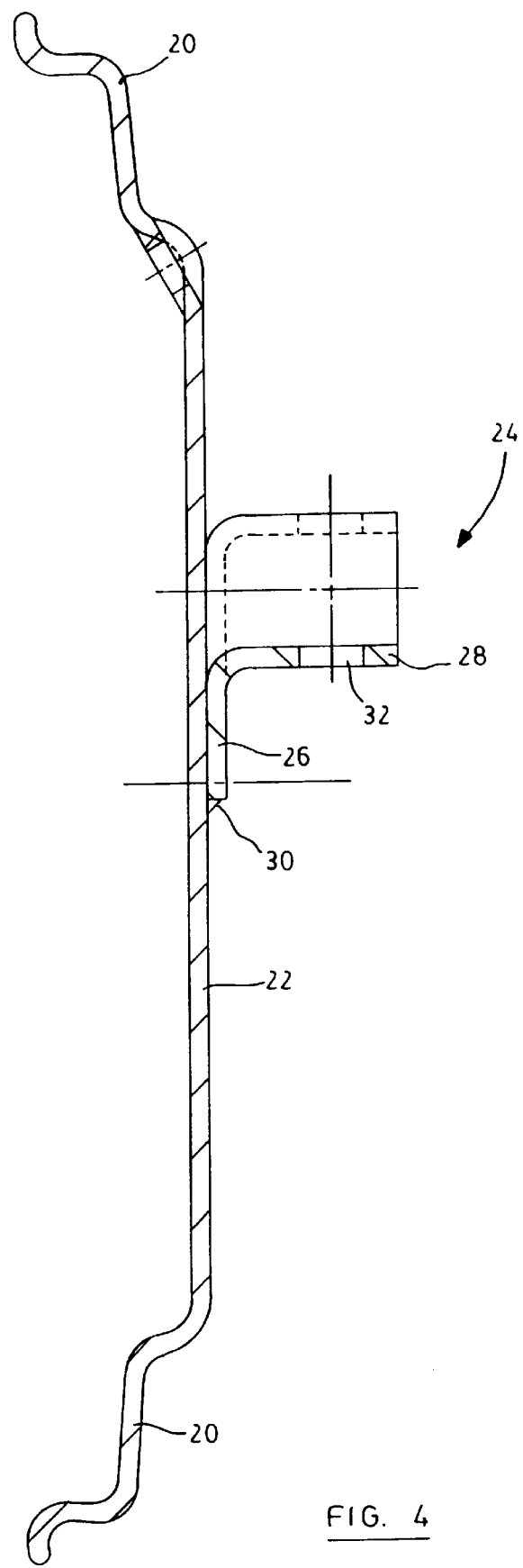
FIG. 4 is a cross-sectional view of FIG. 3 taken along line 4—4.
Figure 5:
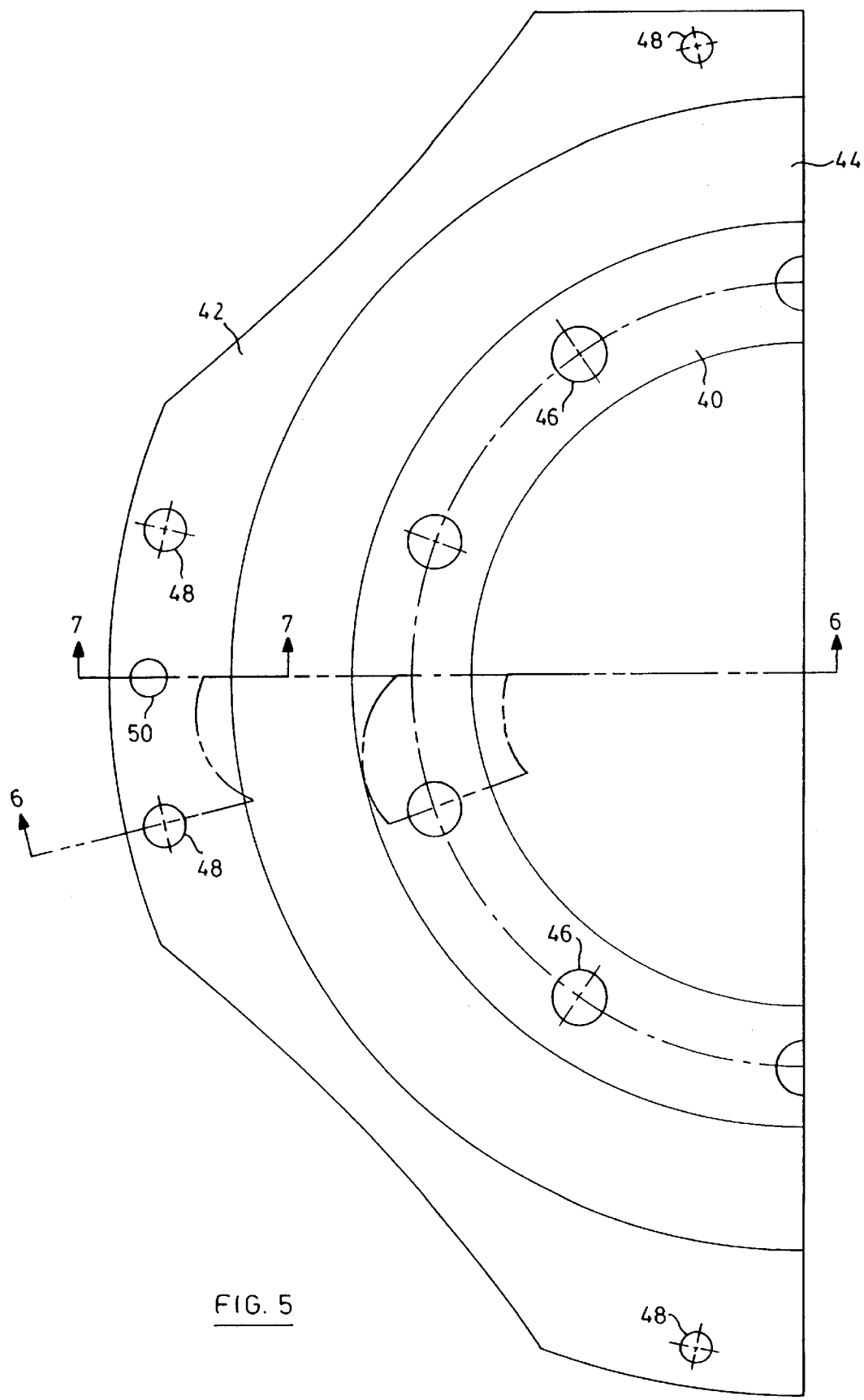
FIG. 5 is a plan view of a portion of a disk forming part of the wheel of FIG. 1.
Figure 6:
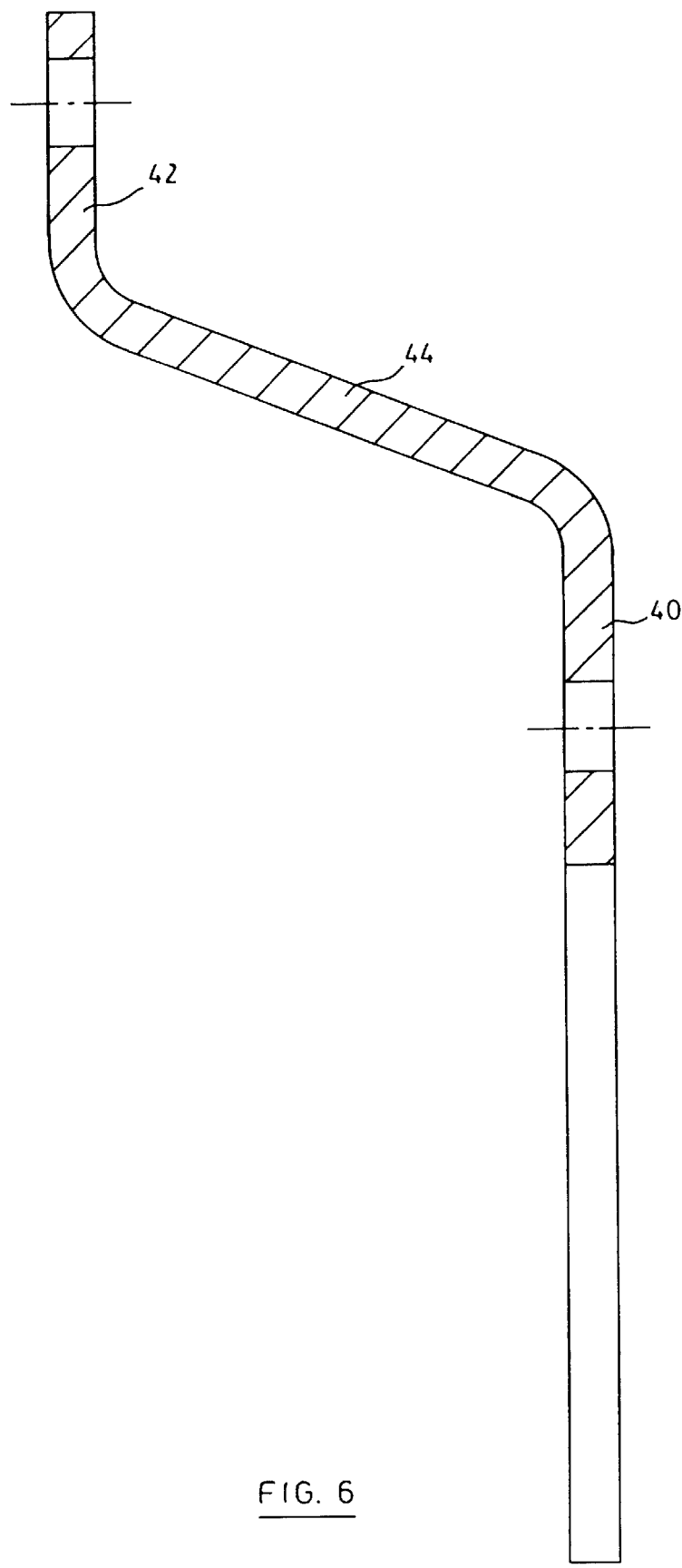
FIG. 6 is a cross-sectional view of FIG. 5 taken along line 6—6.

Turning now to FIGS. 1, 3 and 4, the rim 12 is better illustrated. As can be seen, rim 12 includes a pair of axially spaced, circumferentially extending bead seats 20 interconnected by a generally cylindrical base 22. An annular waffle 24 located in a plane generally perpendicular to the rotational axis 14 is welded to the base 22 intermediate the axial ends of the base.

The waffle 24 includes a pair of flanges 26 and 28 arranged generally at right angles to one another. Flange 26 contacts and overlies a portion of the base 22 and is secured to the base by weld 30. Flange 28 extends radially inwardly and has a plurality of pairs of spaced fastener holes 32, in the present example eight (8) pairs, formed therein. The pairs of fastener holes 32 are located at equally spaced locations about the circumference of the flange 28 at 45 degree intervals so that each pair of fastener holes 32 is diametrically opposite another pair of fastener holes. Positioned midway between the fastener holes 32 of each pair is a disk alignment hole 34.

Referring now to FIGS. 1, 2 and 5 to 7, the disk 16 is better illustrated. As can be seen, the disk 16 includes inner and outer annular flanges 40 and 42 interconnected by an inclined web 44. Equally spaced bolt holes 46 are provided in the inner flange 40 about its circumference to receive studs carried by the hub of a vehicle to which the wheel 10 is to be mounted. A plurality of pairs of spaced fastener holes 48, in this example four (4) pairs, are also provided in the outer flange 42. The pairs of fastener holes 48 are equally spaced about the circumference of the outer flange at 90 degree intervals so that each pair of fastener holes 48 is diametrically opposite another pair and so that the pairs of fastener holes 48 can be aligned with pairs of fastener holes 32 in the flange 28 of waffle 24 when the disk 16 overlies the waffle. A pair of diametrically opposed locators in the form of roller pins 50 extend through the outer flange 42. Each roller pin 50 is positioned midway between the fastener holes 48 of a pair. The roller pins 50 are pressed into holes 52 in the outer flange 42 and are sized to be accommodated in the disk alignment holes 34.

During assembly of the wheel 10, the disk 16 is placed on the waffle 24 so that the roller pins 50 move into mating engagement with a pair of diametrically opposed alignment holes 34. The mating engagement of the roller pins 50 and alignment holes 34 holds the disk in place on the waffle 24 with the fastener holes 48 being aligned with fastener holes 32. The axial alignment of the rim 12 and the disk 16 with the disk in this orientation can then be visually assessed before the disk is secured to the rim by way of the nuts and bolts. If there appears to be axial misalignment between the rim and disk, the disk 16 is removed from the waffle 24 and is rotated to a different orientation. The disk 16 is then placed on the waffle 34 with the roller pins 50 moving into mating engagement with a different pair of alignment holes 34. The axially alignment of the disk and rim is visually assessed once again. This process can be continued until the orientation of the disk with respect to the rim which yields the truest axial alignment of the disk and rim, is determined. At this time, the nuts and bolts are passed through the aligned fastener holes 32 and 48 in the waffle 24 and disk 16 respectively to secure the disk to the waffle.

As will be appreciated by those of skill in the art, since the disk 16 can be located and held on the rim without requiring the disk to be fastened to the rim with bolts as is required in prior art wheels, the orientation of the disk with respect to the rim which yields the truest axial alignment of the disk and rim can be determined quickly and easily.

Although a preferred embodiment of the present invention has been described, those of skill in the art will appreciate that variations and modifications may be made thereto without departing from the spirit and scope thereof as defined by the appended claims.

We claim:

1. A wheel for a vehicle comprising: a rim having a generally cylindrical base disposed about the rotational axis of said wheel and an annular waffle attached to said base, said waffle being located in a plane generally perpendicular to said rotational axis, said waffle having two sets of abutment surfaces circumferentially spaced about said rim with one set offset axially from the other set, a disk having a set of support surfaces complementary to each of said sets of abutment surfaces said disk being removably secured to said waffle by way of a plurality of fasteners received in a first set of holes in said abutment surfaces; and locators associated with selected ones of said support surfaces to locate and hold said disk on said waffle, said locators being received in corresponding ones of a second set of holes in said abutment surfaces and having a close fit therein to allow the axial alignment of said disk and rim prior to securing said disk to said waffle via said fasteners.

2. A wheel as defined in claim 1 wherein said locators allow said disk to be located and held on said waffle at a plurality of different orientations so that the orientation which yields the truest axial alignment of said disk and rim can be determined before said disk is secured to said waffle via said fasteners.

3. A wheel as defined in claim 2 wherein said locators are in the form of at least two diametrically opposed pins on said disk and complimentary alignment holes in said waffle.

4. A wheel as defined in claim 3 wherein said diametrically opposed pins are provided on said disk and wherein said alignment holes are provided in said waffle at equally spaced locations about the circumference of said waffle.

5. A wheel as defined in claim 4 wherein said waffle includes eight alignment holes therein spaced about the circumference of said waffle at 45 degree intervals and wherein said disc has one pair of diametrically opposed pins thereon.

6. A wheel as defined in claim 5 wherein said alignment holes and said pins are located generally midway between pairs of fastener holes provided in said waffle and disk, said fastener holes accommodating said fasteners.

7. A wheel for a vehicle comprising:

a rim disposed about the rotational axis of said wheel and having a pair of axially spaced, circumferentially extending bead seats interconnected by a generally cylindrical base;

an annular waffle located in a plane generally perpendicular to said rotational axis and being secured to said base intermediate the axial ends thereof; and a disk removably secured to said waffle by way of a plurality of fasteners, said disk and waffle carrying co-operating interengaging formations supplementary to said fasteners and which can be brought into mating engagement to allow said disk to be located and held on said waffle at a plurality of different orientations to allow the orientation of said disk with respect to said rim which yields the truest axial alignment of said disk and rim to be determined prior to securing said disk to said waffle via said fasteners.

8. A wheel as defined in claim 7 wherein said co-operating formations are in the form of pins on one of said disk and waffle and complimentary alignment holes in the other of said disk and waffle.

9. A wheel as defined in claim 8 wherein said co-operating formations include a pair of diametrically opposed pins on said disk and a plurality of alignment holes in said waffle equally spaced about the circumference thereof.

10. A wheel as defined in claim 9 wherein said waffle includes eight alignment holes therein spaced about the circumference of said waffle at 45 degree intervals.

11. A wheel as defined in claim 10 wherein said alignment holes and said pins are located generally midway between pairs of fastener holes provided in said waffle and disk, said fastener holes accommodating said fasteners.

12. In a wheel for a vehicle having a rim disposed about the rotational axis of said wheel and including axially spaced, circumferentially extending bead seats interconnected by a generally cylindrical base; a waffle located in a plane generally perpendicular to said rotational axis and being secured to said base intermediate the opposite ends of said base and a disk removably secured to said waffle by fasteners extending therebetween the improvement comprising:

locating means supplementary to said fasteners to locate and hold said disk on said waffle at a plurality of different orientations to allow the orientation of said disk with respect to said rim which yields the truest axial alignment of said disk and rim to be determined prior to securing said disk to said waffle.

13. A wheel as defined in claim 12 wherein said locating means is in the form of a pair of diametrically opposed pins on said disk and a plurality of alignment holes in said waffle, said alignment holes being equally spaced at 45 degree intervals about the circumference of said waffle.

* * * * *